3,071,420
BEARING APPARATUS
Lawrence C. Simmons, Cleveland, Ohio, assignor, by mesne assignments, to Cleveland Technical Center, Inc., Cleveland, Ohio, a corporation of Delaware
Filed Oct. 12, 1961, Ser. No. 144,598
6 Claims. (Cl. 308—87)

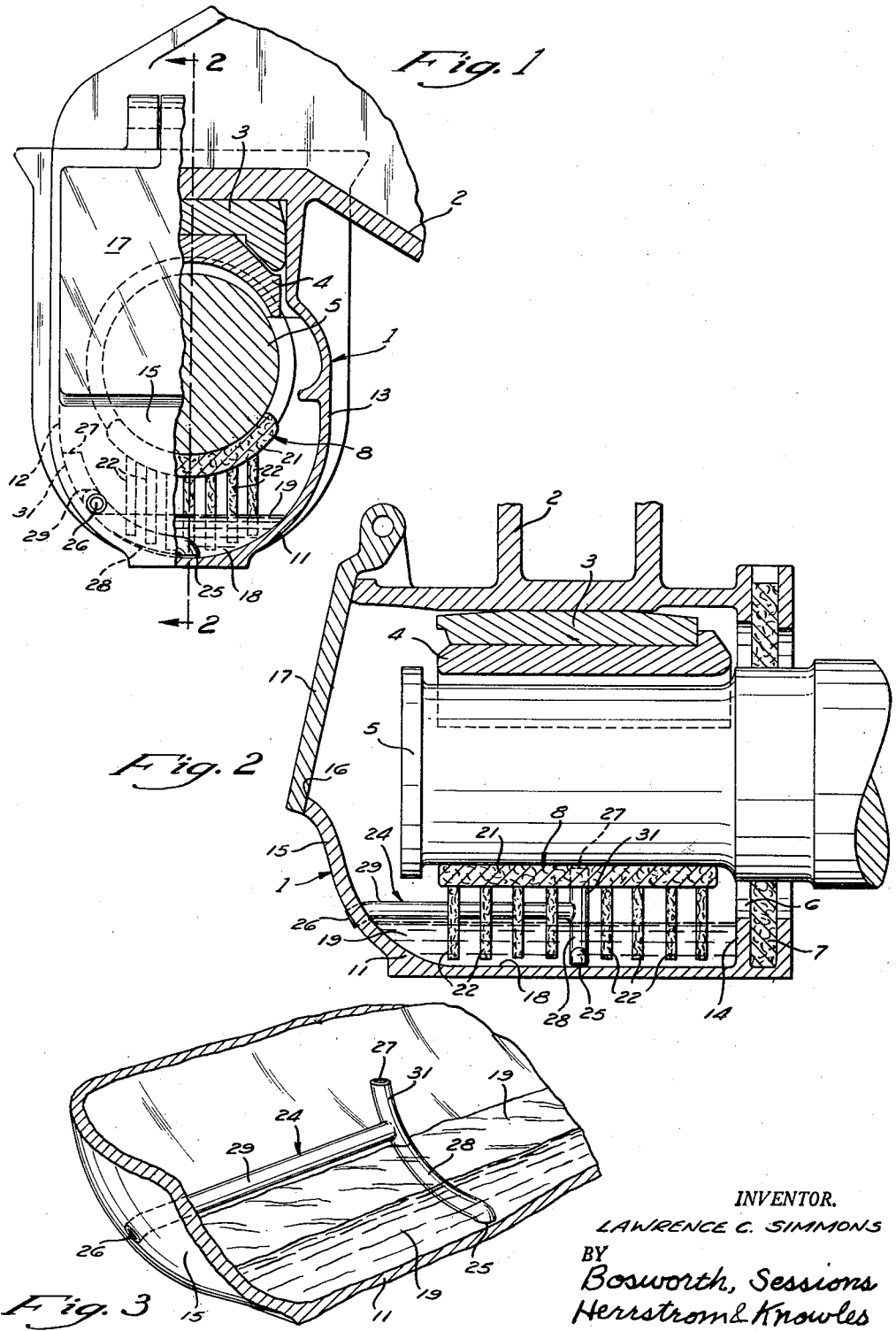

This invention relates to bearing apparatus, and more particularly to bearing apparatus comprising a journal box containing a pool of liquid lubricant from which lubricant is conducted to the engaging surfaces of a bearing and a journal. While the invention may be capable of other applications, it provides particular advantages and hence will be described in connection with railroad car journal boxes.

Hot boxes have long been a problem in railroad car operation, despite great efforts to prevent them. They cause substantial losses from interruptions of operations, damage to equipment and repairs, and can also cause wrecks. Present economic conditions in the railroad industry have intensified already substantial efforts to eliminate or greatly reduce the incidence of hot boxes; while such efforts in part have been successful the occurrence of hot boxes and their attendant disadvantages are still undesirably frequent.

Basically, hot boxes result from insufficient bearing lubrication. Many initiating causes of hot boxes have been determined and guarded against, including the lack of lubricant due to negligence in filling or leakage due to defects in journal boxes, waste grabs which are likely to occur if the bearing has a substantially larger radius of curvature than the journal, displacement of the bearing on the journal from severe buffing shocks, dry or misplaced packing, overloaded cars or cars with shifted lading, out of round wheels, out of square trucks, bent axles, and defective bolsters, spring or snubbing devices. However, hot boxes, as well as other difficulties arising out of loss of lubricant from journal boxes, still occur for reasons which I believe to have been unknown prior to my invention.

Statistical records show that in waste-packed journal boxes having solid bearings, considerably more hot boxes occur in the summer than in the winter. It has been thought that this resulted from reduced viscosity of lubricating oil from high ambient temperatures. In use of the more recent types of journal boxes having solid bearings and pad type lubricators, on the other hand, records indicate that considerably fewer hot boxes occur in the summer than in the winter. This is obviously inconsistent with the theory that the reduced viscosity of the lubricant resulting from higher ambient temperatures increases hot box frequency.

Difficulties have also arisen from liquid lubricant overflowing through the rear seals of the journal boxes, dropping on the balls of track rails, and reducing friction between the driving wheels of locomotives and the rails sufficiently to prevent locomotives from delivering their full traction. To prevent this, precautions have been instituted in the inspection and filling of journal boxes to prevent overfilling of the boxes with lubricant. despite the trouble and expense of these precautions, there still is a serious problem of overflowing of lubricating oil from journal boxes onto tracks. Paradoxically, situations have often occurred when oil on the tracks has indicated the presence of too much lubricant in journal boxes, while concurrent frequent occurrence of hot boxes has indicated, according to the previously held theories, the presence of too little lubricant in journal boxes.

I have discovered a major cause, which I believe to have been previously unknown, of the above and analogous problems; and I have provided a solution which can substantially reduce, if not entirely eliminate hot boxes arising from such cause and which can also substantially eliminate the overflow of journal box lubricant onto railroad tracks. I have found that the presence of water in journal boxes in sufficient amounts to raise the level of the liquid lubricant is basically the cause of a large number of hot boxes, of overflow of lubricant on tracks, and of the occurrence of more hot boxes in waste-packed journal boxes in the summer and in journal boxes having pad type lubricators in the winter. Water can be introduced into a journal box from various sources, such as rain, splashing from ground-standing water, leakage of water through the rear seals of the box due to centrifugal action of the axle, or condensation from the atmosphere. The water, because of its greater density, collects under the lubricant at the bottom of the journal box. In time, a sufficient quantity of water may accumulate under the floating lubricant to raise the level of the lubricant sufficiently to cause it to overflow through the rear seal of the journal box onto the rails. If sufficient water accumulates in the bottom of the journal box it can raise the level of the lubricant to cause so much lubricant to leak out of the journal box that insufficient lubricant remains to perform an adequate job of lubrication, and a hot box results. This can occur whether the journal box is of the waste-packed type or the pad lubricator type.

The above indicated seasonal variations in hot box frequency with waste-packed journal boxes occur because a portion of water introduced into a waste-packed journal box remains in the waste rather than drawing into the bottom of the box. If the journal box is exposed to a warm ambient, as can occur during the summer, the water in the waste evaporates, leaving dry spots in the waste and resulting in a deficiency in journal lubrication which can cause a hot box. In the winter, on the other hand, low ambient temperatures decrease the rate of evaporation of the water, and hence reduce the tendency to form dry spots in the waste which can engender hot boxes.

The reverse seasonal variation in frequency of hot boxes in journal boxes having pad type lubricators occurs because all of the water introduced into the box passes to the bottom of box and under the pool of liquid lubricant, since the walls of the journal box are not contacted by masses of capillary waste material which can absorb or entrap entering water. When the box is exposed to a warm ambient in the summer, the heat transmitted to the water through the journal box walls and through the lubricant causes the water to overcome the surface tension of the oil and evaporate; so long as the water removed by evaporation equals or exceeds that added from various causes, the level of lubricant will not rise sufficiently to cause harmful loss by leakage, and the possibilities of overflowing lubricant and a resulting hot box are reduced. During the winter, on the other hand, the tendency for the water to evaporate is reduced due to the lower temperatures, so that more water can accumulate to displace the oil and thus cause an increased possibility of a hot box.

It is an object of the present invention to provide means for reducing the possibilities of hot boxes by automatically removing, substantially concurrently with its accumulations, most or substantially all water which collects in the bottom of a journal box below the pool of liquid lubricant. Another object is the provision of means for reducing leakage of oil from the journal box by preventing the accumulation in a journal box of enough water to raise the level of liquid lubricant in the box sufficiently to cause a substantial amount of lubricant to overflow from the box. Another object is the provision of means for continuously equalizing the air pressures in and outside the journal box, and thus reducing or eliminating possibilities that movement of the journal can pump water into the journal box through the bearing seals. A further object is to provide a lubricant level indicator at the front of the journal box.

Other objects of the invention will be apparent from the following description of a preferred embodiment thereof in connection with the accompanying drawings, in which:

FIGURE 1 is an end elevation, with parts broken away, of a portion of the railroad car truck including a journal box assembly embodying the present invention;

FIGURE 2 is a sectional elevation along line 2—2 of FIGURE 1; and

FIGURE 3 is a perspective of the lower portion only of the journal box of the preceding figures, showing the apparatus of the invention.

FIGURES 1, 2 and 3 show a journal box assembly of the solid bearing, pad lubricator type, which is displacing the waste packed type of journal box in railroad service, and in which the invention provides the greatest advantages. In these figures, a journal box 1, mounted on a railroad car truck frame 2, carries a wedge 3 on which is mounted a solid bearing 4 engaging the journal 5 of a railroad car wheel and axle set. The journal box 1 has a rear opening 6 through which the journal projects and at which is located a conventional rear seal 7, which is primarily a dust seal. A pad type lubricator 8 of conventional type is mounted in the box to contact and supply lubricant to the lower part of the journal 5, which lubricant is then carried between the engaging surfaces of the journal and bearing by rotation of the journal.

The journal box 1 comprises a lower wall 11 terminating in upwardly extending side walls 12 and 13, the inner upper portions of which are formed to locate the wedge 3 and the solid bearing 4. It also includes an upwardly extending rear wall 14 through which the opening 6 extends and in which the rear seal 7 is mounted in the usual manner, and an upwardly extending front wall 15 having an opening 16 closed by a top hinged cover 17.

The inner surfaces of the lower portion of the journal box 1, comprising the bottom wall 11 and the lower portions of front wall 15 and rear wall 14, thus define a reservoir 18 adapted to contain a pool 19 of liquid lubricant, such as oil.

In the apparatus illustrated, the pad type lubricator 8 is of a conventional type comprising a pad 21 held in place against the lower surface of the journal 5 by suitable conventional means, not shown, and suspending a plurality of downwardly extending wicking elements 22 the lower extremities of which extend into the pool 19 of liquid lubricant. Both the pad 21 and wicking elements 22 are formed of suitable material capable of conducting the lubricant by capillary action from the pool 19 to the lower surface of the journal 5.

All of the structure described to this point is of known, conventional type. In the absence of the present invention, water introduced into the journal box, as from any of the causes mentioned above, tends to collect under the lubricant in pool 19 at the bottom of the reservoir 18, this being facilitated because the inner walls of the journal box are not contacted appreciably if at all by fibrous material which could prevent the water from traveling to the reservoir. If sufficient water is introduced quickly, or accumulates over a period of time, the level of the top surface of the pool 19 of liquid lubricant floating on the water rises until the lubricant flows over the lower edge of the opening 6 in the rear wall 14 and past the rear seal 7. If enough water accumulates, most, if not all, of the lubricant in the journal box can be caused to overflow out of the journal box in this manner, so that the resulting lack of lubricant can cause a hot box. Moreover, since the point of overflow lies very nearly directly above the ball of the rail on which the car wheel is traveling, most of the overflowing lubricant drops on the rail, where it can cause the above described slippage or locomotive driving wheels.

In the apparatus of the drawings the water which accumulates under the lubricant 19 in the reservoir 18 is automatically and concurrently removed by the conduit means 24 which provides a passage through which the water flows; this passage has an inlet 25 sufficiently spaced from the inner surface of the bottom wall 11 of the journal box to permit free access of water to the inlet, but close enough to the bottom wall 11 to permit only a small amount of water to remain in the reservoir after draining; the passage also has an outlet 26 opening to the exterior of the journal box, preferably at the front of the box as shown to provide important advantages to be described later.

Preferably, in the passage for water through conduit means 24 the highest point of the bottom of the passage is at the highest level desired for the top of pool of lubricant, but well below the lowermost edge over which the lubricant could overflow at the rear of the journal box which edge usually is the bottom of the opening 6 in the rear wall 14 of the box. Most desirably, the outlet 26 is located at substantially the level of the highest portion of the passage through conduit means 24, and the major portion of the passage is substantially horizontal as shown.

It is also preferable that the conduit means 24 have a vent which communicates with the passage and with a vent opening 27 substantially above the maximum level to be reached by the top surface of lubricant in the reservoir.

One of the simplest and least expensive conduit means 24 takes the form of the tubular structure shown in the drawings and to particular advantage in FIGURE 3. This structure comprises a tubular intake portion 28 at the lower end of which is the inlet 25, a tubular horizontal portion 29 located at the highest desired lubricant level as indicated above and communicating with the intake portion 28 and the outlet 26, and a vent portion 31 communicating at its lower end with the horizontal portion 29 and intake portion 28 and at its upper end with vent opening 27. The tubular portions 28, 29 and 31 preferably are arranged so that all portions of the conduit member are located adjacent one of the curved portions of the bottom wall 11 of the journal box, where they will not interfere with the lubricator, as is apparent from FIGURE 1. Also preferably, the wicking elements 22 are arranged so that their lower extremities are located above the inlet 25, so that they cannot extend into and conduct water to the bearing from the water under the pool 19 of lubricant.

The operation of this apparatus is as follows: On the initial filling of the journal box with liquid lubricant, the conduit means 24 prevents overfilling with lubricant. The location of the outlet 26 of the conduit means at the front of the journal box provides an easily seen indication as to when the desired maximum level of lubricant has been reached on filling. Any excess lubricant flows out of the front of the journal box and drops away from the ball of the track so that it cannot cause locomotive slippage. The vent opening 27 communicating with the passage outlet 26 to the exterior of the journal box equalizes air pressures inside and outside the journal box, and thus reduces or eliminates any tendency of the moving journal to produce a reduced pressure in the journal box which can pump water into the box through the rear seal. It also reduces any tendency for a higher than atmospheric pressure to be developed in the box which could cause lubricant to flow out of the box through the rear seal. If water is introduced into the journal box, either from condensation, splashing, rain, or other causes, and travels to the bottom of the reservoir 18 under the pool 19 of lubricant, the accumulation of sufficient water to raise the lubricant to a level where it can overflow is prevented because the water is drained from the bottom of the journal box through the inlet 25 of the conduit means 24 and discharged from the box through the outlet 26, under pressure of the head of the lubricant and water in the box. Furthermore, removal of substantially all of this bottom layer of water eliminates any tendency for the lubricant at the free or top level to slosh or spill over the rear seal on sudden movement or tilting of the journal box. Meanwhile, ample supplies of lubricant are conducted by wicking elements 22 and pad 21 to the journal 5 from the pool 19 of lubricant, in which the lower ends of the wicking elements are immersed.

In this manner there is prevented loss of lubricant due to accumulation of substantial amounts of water, hot boxes resulting from such loss of lubricant, and overflowing of lubricant through the rear seals of the journal boxes onto the tracks where it can cause slippage of locomotive wheels. Not only are costs resulting from hot boxes reduced, but the frequency and hence costs of inspection and refilling of journal boxes are also greatly reduced.

While the invention has been described as used in journal boxes equipped with pad type lubricators, in which it provides the greatest advantages, it may also be employed advantageously in journal boxes of the waste-packed type. In such boxes there necessarily is some free lubricant in the bottom of the journal box which is conducted by capillary action of the waste fibers to the bottom of the rotating journal. This free lubricant can also be lost due to an accumulation of a substantial amount of water sufficient to raise the level of the lubricant so that it can overflow through the rear seals. By conduit means 24 like that described above, the accumulation of appreciable amounts of water at the bottom of the reservoir in the journal box can be prevented as described in connection with the preceding embodiment. Consequently, with waste-packed boxes, the invention also makes it possible to avoid hot boxes resulting from loss of the free lubricant at the bottom of the reservoir due to water accumulations; to avoid locomotive slippage due to lubricant overflowing onto the track; and to gain the above described advantages of convenient lubricant level indication prevention of overfilling, and substantial cost savings.

While the invention has been discussed in connection with railroad journal boxes embodying two types of means for conducting lubricant from the bottom of the journal box to the under side of the journal, it may be employed in connection with railroad journal boxes employing other types of lubricators, and may be employed in other bearing apparatus in which lubricant in a pool may overflow and be lost due to an accumulation of water or other liquid heavier than oil.

Those skilled in the art will appreciate that various other changes and modifications can be made in the disclosed embodiments of the invention without departing from the spirit and scope thereof. The essential characteristics of the invention are described in the appended claims.

I claim:

1. A journal box adapted to carry a bearing which engages a rotatable journal and also adapted to support means conducting liquid lubricant to said journal from a pool of said lubricant located below said journal, said journal box comprising a portion having at least one upwardly extending wall defining a reservoir located below the journal and adapted to contain said pool of lubricant; and conduit means providing a passage having an inlet located near the bottom of said reservoir and an outlet located in said upwardly extending wall of the journal box and opening to the exterior of said box, the highest point of the bottom of said passage over which liquid can flow in said passage being at the highest level to be reached by the lubricant in said journal box, said conduit means also comprising a vent communicating with said passage between its inlet and outlet and with a vent opening located above the highest level to be reached by the lubricant in said reservoir.

2. A journal box adapted to carry a bearing which engages a rotatable journal and also adapted to support means conducting liquid lubricant to the journal from a pool of said lubricant located below said journal, said journal box comprising a portion having an upwardly extending front wall defining a reservoir located below the journal and adapted to contain said pool of lubricant; and conduit means providing a passage having an inlet located near said bottom of the reservoir and an outlet communicating with the exterior of the journal box through said front wall, the highest point of the bottom of said passage over which the liquid can flow in said passage being at the highest level to be reached by the lubricant in the journal box and being located below the lowermost opening edge in the journal box over which lubricant could otherwise overflow, said conduit means also including a vent communicating with said passage between its inlet and outlet and with a vent opening located above the highest level to be reached by the lubricant in the reservoir.

3. The combination of a rotatable journal; a bearing which engages said journal; a journal box carrying said bearing and comprising a portion having an upwardly extending front wall of the journal box and defining a reservoir located below said journal adapted to contain a pool of liquid lubricant; means conducting liquid lubricant to said journal from said pool; and conduit means providing a passage having an inlet located near the bottom of the reservoir in said journal box and an outlet communicating with the exterior of said journal box through said front wall, the highest point of the bottom of said passage over which liquid can flow in said passage being at the highest level to be reached by the lubricant in said journal box and being located below the lowermost opening edge in said journal box over which lubricant could otherwise overflow, said conduit means also including a vent communicating with said passage between its inlet and outlet and with a vent opening located above the highest level to be reached by the lubricant in said reservoir.

4. A journal box adapted to carry a bearing which engages a rotatable journal and also adapted to support means conducting liquid lubricant to the journal from a pool of said lubricant located below said journal, said journal box comprising a portion defining a compartment adapted to contain said pool of lubricant; and conduit means providing a passage having an inlet located at the bottom of said compartment and an outlet communicating with the exterior of said journal box, the highest point over which liquid can flow in said passage being at a level substantially higher than the bottom of said compartment, said conduit means also including a vent communicating with said passage and with a vent opening located above said highest point in said passage.

5. A journal box adapted to carry a bearing which engages a rotatable journal and also adapted to support means conducting liquid lubricant to the journal from a pool of said lubricant located below said journal, said journal box comprising a portion defining a compartment located below the journal and adapted to contain said pool of lubricant; and conduit means providing a passage having an inlet located at the bottom of said compartment and an outlet communicating with the exterior of said journal box, the highest point of said passage over which liquid can flow in said passage being a substantial distance above the bottom of said compartment, said conduit means also including a vent communicating with said passage and with a vent opening located in said journal box above said highest point in said passage.

6. A journal box adapted to carry a bearing which engages a rotatable journal and also adapted to support means conducting liquid lubricant to the journal box from a pool of said lubricant located below said journal, said journal box comprising a portion having an upwardly extending front wall and defining a compartment located below the journal and adapted to contain a pool of lubricant; a tube having one end thereof opening in close proximity to the bottom of said compartment, and the other end thereof opening through said front wall of said journal box with the exterior of said journal box, the highest point in said tube being a substantial distance above the bottom of said compartment, and another tube one end of which is in communication with said first tube between its ends and the other end of which opens above the highest point in said first tube.

References Cited in the file of this patent
UNITED STATES PATENTS 2,159,750    Runner _____ May 23, 1939